United States Patent [19]
Roche et al.

[11] 3,779,264
[45] Dec. 18, 1973

[54] AUTOMATIC PRESSURE-RELIEF RUPTURE DISC CHANGER

[75] Inventors: Joseph R. Roche; Mat M. Bowen, both of Houston, Tex.

[73] Assignee: FMC Corporation, San Jose, Calif.

[22] Filed: Oct. 10, 1972

[21] Appl. No.: 296,493

[52] U.S. Cl.................. 137/68, 137/329, 220/89 A
[51] Int. Cl............................................. F16k 17/40
[58] Field of Search ......................... 137/68–71, 329, 329.06, 270; 220/89 A

[56] References Cited
UNITED STATES PATENTS

| | | | |
|---|---|---|---|
| 1,998,074 | 4/1935 | Childress | 137/329 |
| 2,764,173 | 9/1956 | Renner | 137/68 |
| 3,319,661 | 5/1967 | Shindler | 138/94.3 |

FOREIGN PATENTS OR APPLICATIONS

| | | | |
|---|---|---|---|
| 364,515 | 11/1922 | Germany | 137/68 |

Primary Examiner—Edgar W. Geoghegan
Assistant Examiner—Richard Gerard
Attorney—F. W. Anderson et al.

[57] ABSTRACT

An automated apparatus for holding and changing pressure-relief rupture discs in a pipe line or other fluid conduit. The apparatus includes a gate-like disc carrier with a pair of apertures in each of which a rupture disc is secured, a housing or body in which the carrier is slidably disposed, and a pneumatic cylinder or similar operator connected to the carrier for moving the discs in and out of the line. When either one of the discs is in functional position in the line the other disc is accessible for replacement or servicing without need for line shutdown or apparatus disassembly.

6 Claims, 4 Drawing Figures

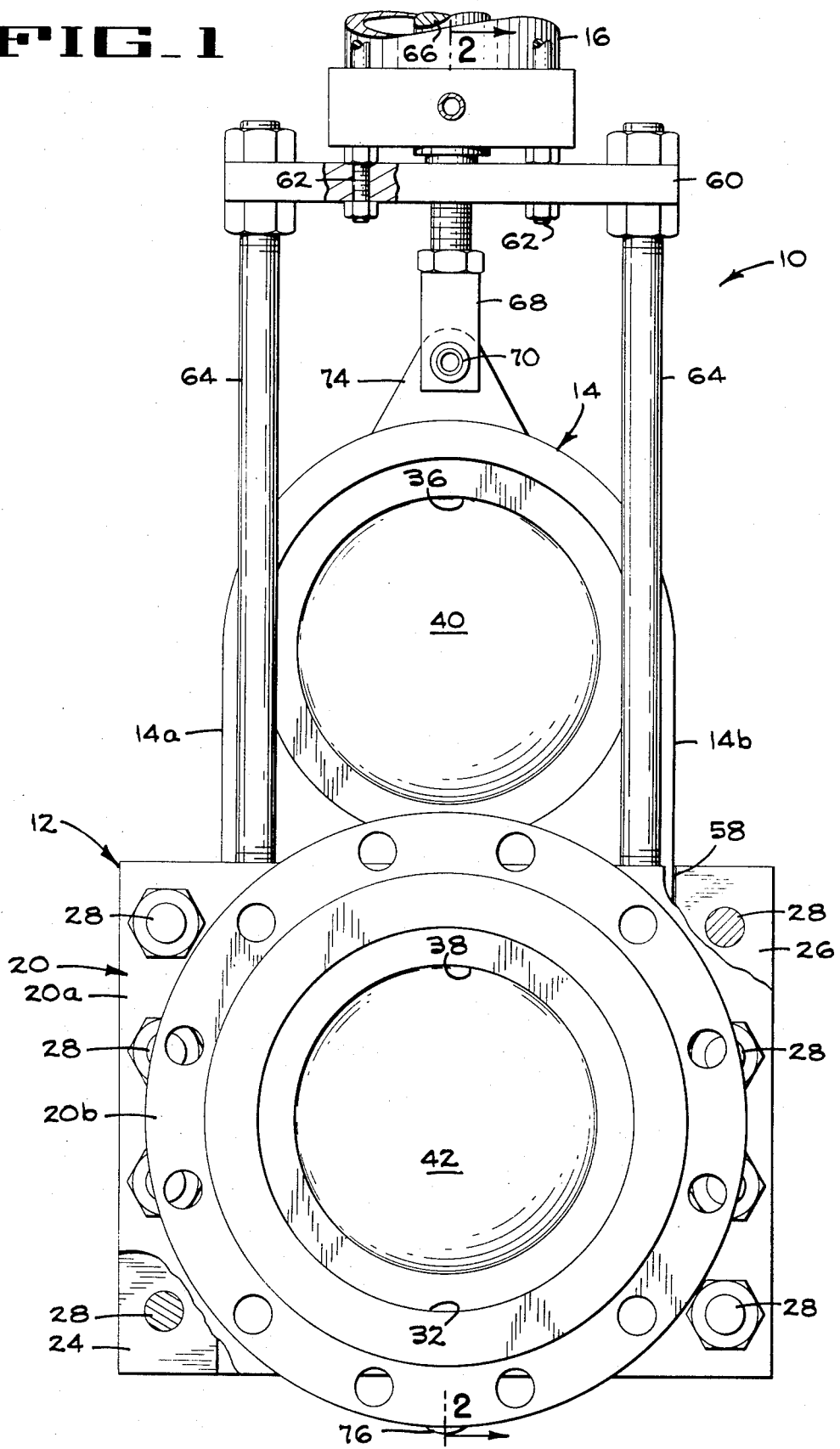
FIG_1

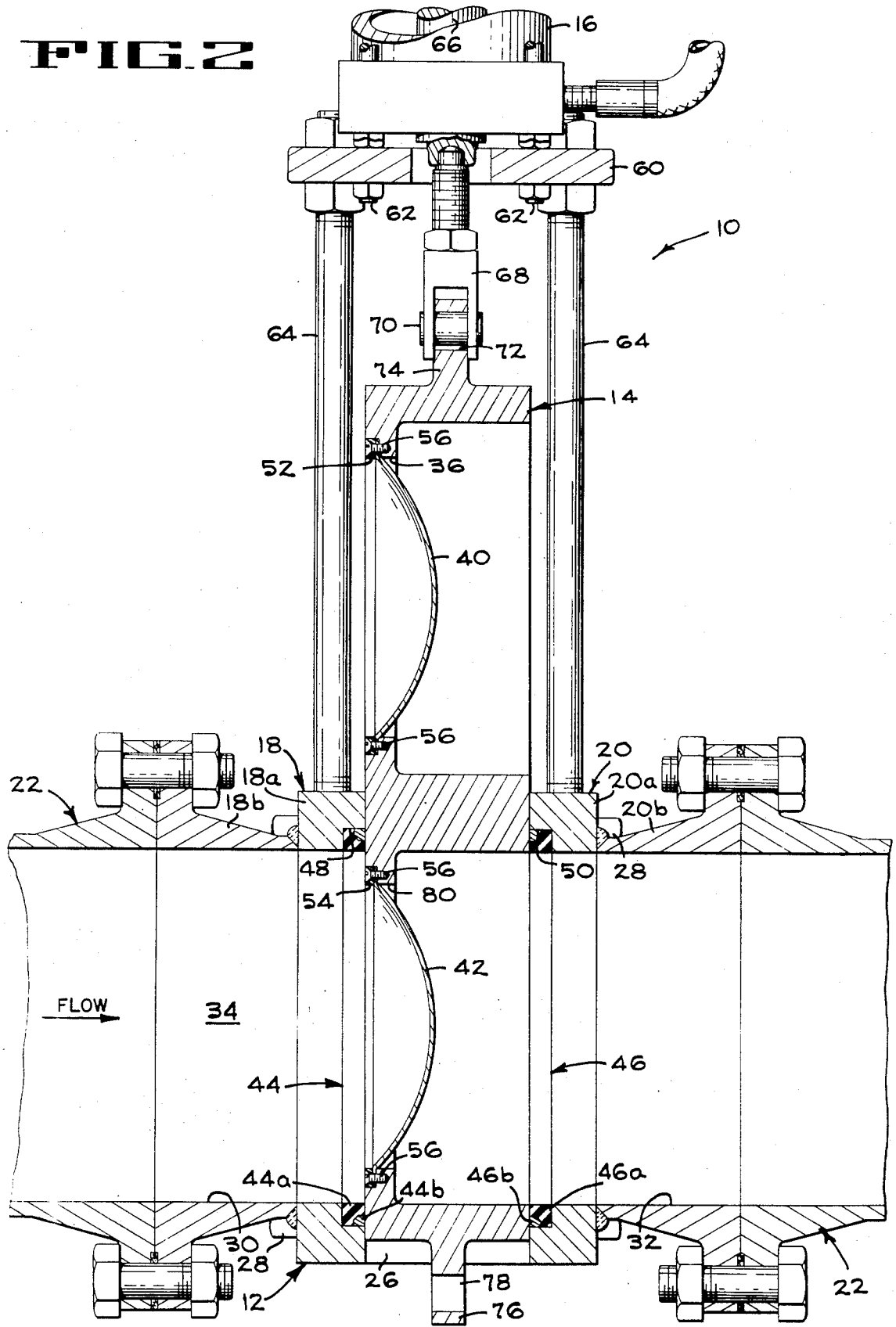

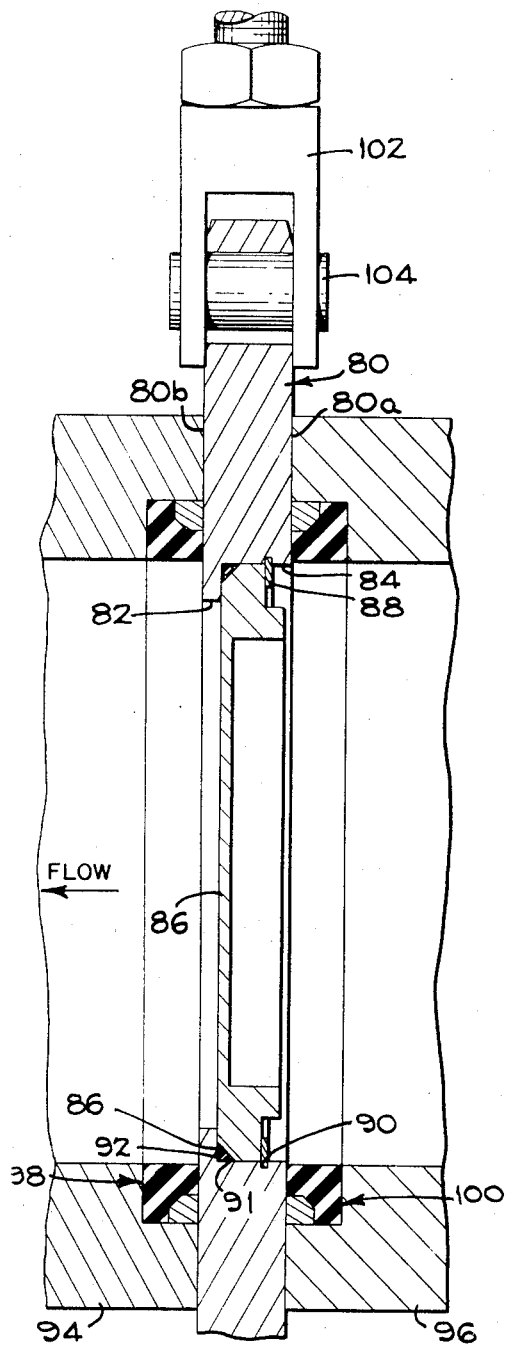
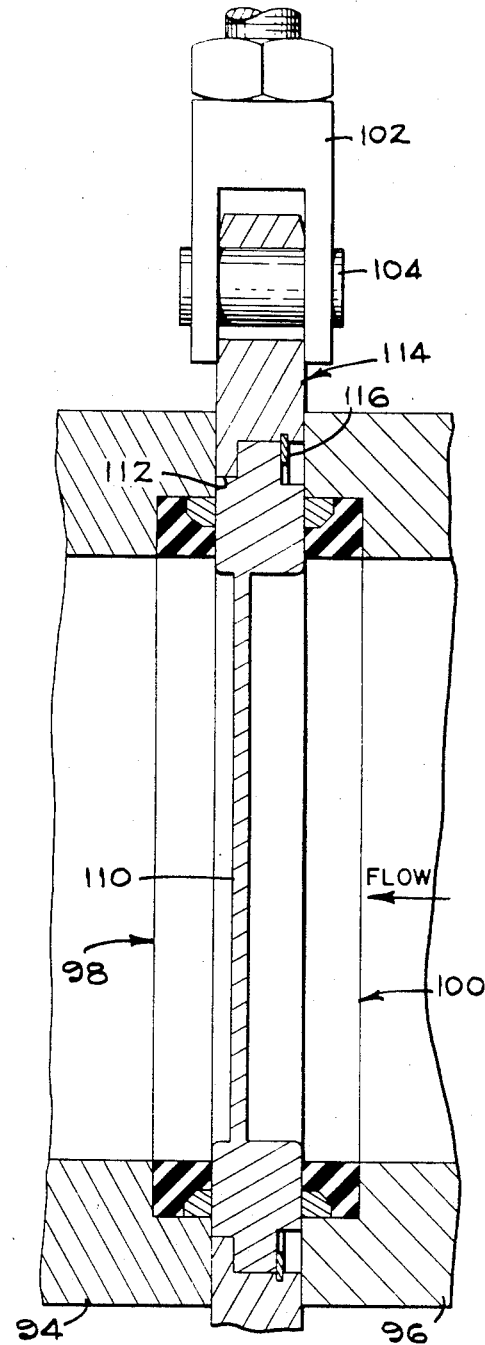

AUTOMATIC PRESSURE-RELIEF RUPTURE DISC CHANGER

BACKGROUND OF THE INVENTION

The use of rupture discs as safety devices for venting hazardous pressure buildup in pipe lines and other types of fluid systems has become a widely accepted industrial practice. Typically, rupture discs are bolted into safety heads or between pipe flanges, and in order to inspect or replace a disc these installations require shutdown of the line or otherwise isolating the disc from the pressure system, and then manual disassembly of the head or the flanges. Accordingly, the cost of labor and downtime incurred in servicing rupture discs in installations of this type, which undesirably is rather frequent, can be considerable.

The prior art in this field includes various types of arrangements for positioning and securing a rupture disc in a fluid flowline. U.S. Pat. No. 2,764,173, granted on Sept. 25, 1956, to C. N. Renner, is particularly of interest in this regard, for it discloses a gate valve having a rupture disc mounted in the flow passage of its gate, the disc thereby being insertable in and withdrawable from the line by closing and opening the valve. Although this Renner valve is an improvement over earlier types of rupture disc devices, it still has the severe disadvantage of necessitating shutdown of the line and then substantial disassembly of the valve, including removal of its bonnet, gate, and related elements in order to make the disc accessible for servicing. As a result, considerable downtime and expense still are involved when Renner's gate valve is employed.

SUMMARY OF THE INVENTION

The present invention solves the foregoing problems by providing an apparatus with two pressure-relief rupture discs individually installable in functional position in a pipe line, etc., and arranged so that when one disc is in such position the other is freely accessible from outside the apparatus. In one form the invention is embodied in an apparatus including a pair of rupture discs mounted in individual side-by-side apertures in a gate-like carrier that is slidably disposed in a housing or body connectible into a pipe line or other fluid conduit, and an operator mechanism such as a pneumatic cylinder mounted on the body and attached to the carrier to provide a means for reciprocating the carrier to install the discs in and remove them from the line. The carrier is sealed in a fluid-tight manner to the body so that there is no need to shut down the line when moving a disc into or out of it. When either of the rupture discs is in the line the other is disposed outside the body of the apparatus where it can be serviced or replaced without need for disassembly of the apparatus in any way. If desired, the operator can be interconnected with a control system for actuation in response to a predetermined signal, thus facilitating disc change automatically when the need for it arises.

Accordingly, one object of the present invention is to provide a means for changing pressure-relief rupture discs in a pipe line or other fluid conduit without having to shut the line down.

Another object of the invention is to provide an automated rupture disc changer that will replace a ruptured disc in a pipe line, etc., with a new disc automatically in response to a predetermined signal.

Yet another object of the present invention is to provide a rupture disc changer that facilitates servicing or replacement of a ruptured disc without having to disassemble the changer.

Still another object of the present invention is to provide a new type of rupture disc holder having a plurality of discs mounted and arranged for sequential positioning in a pipe line or similar fluid conduit.

BRIEF DESCRIPTION OF THE DRAWINGS

FIG. 1 is an end elevation of an automated rupture disc changer according to the present invention, showing two metallic rupture discs mounted in a disc carrier that is illustrated in its upper position.

FIG. 2 is a longitudinal section along the line 2—2 of FIG. 1, showing the automated rupture disc changer installed in a pipe line.

FIG. 3 is an enlarged fragmentary section showing a graphite rupture disc mounted in a modified carrier element.

FIG. 4 is a fragmentary section of a modified form of the carrier and rupture disc of FIG. 3.

DESCRIPTION OF THE PREFERRED EMBODIMENTS

Referring first to FIGS. 1 and 2, in accordance with the present invention one embodiment of an automated rupture disc changer 10 comprises a housing or body 12 into which a rupture disc carrier 14 is slidably disposed. An operator, such as a pneumatic cylinder 16, is disposed above the housing or body 12 for reciprocating the disc carrier between its upper and lower positions. In many respects this embodiment resembles the line blind apparatus described in U.S. Pat. No. 3,319,661, issued to G. R. Shindler on May 16, 1967.

The body 12 comprises a pair of substantially identical flanged body subs 18, 20, each of which includes an inner member 18a, 20a, respectively, between which the carrier 14 is disposed, and an outer flange member 18b, 20b, respectively, for mounting the device in a pipe line 22 (FIG. 2). A pair of spacers 24, 26 are disposed between the inner members 18a, 20a along their opposite sides to maintain these members spaced from each other a fixed predetermined distance. The body subs 18, 20 and the spacers 24, 26 are securely fastened together by a plurality of bolts 28 that extend through aligned holes (not shown) in the inner members 18a, 20a and the spacers 24, 26.

The body subs 18, 20 have bores 30, 32, respectively, and when the body 12 is assembled these bores are in axial alignment to provide a flow passage 34 completely through the body. Thus, when the automated rupture disc changer 10 is properly connected into the pipe line 22, the flow passage 34 continues the flow line of the pipes.

The disc carrier 14 is provided with a pair of apertures 36, 38, and in each of these apertures is mounted a frangible metallic rupture disc 40, 42. A pair of annular resiliently compressible seal elements 44, 46 (FIG. 2), comprising bodies 44a, 46a of rubber, plastic, etc., and anti-extrusion rings 44b, 46b, are positioned in counterbores 48, 50 in the inner members 18a, 20a of the body subs, to provide a fluid-tight barrier between the body subs and the rupture disc carrier 14 around the flow passage 34. In the embodiment illustrated in FIGS. 1 and 2, the metallic rupture discs 40, 42 are secured to the disc carrier 14 by retaining rings 52, 54, the rings being held in place by circumferentially spaced flat-head machine screws 56.

Accordingly, when either of the rupture discs 40, 42 is properly positioned in the flow passage 34, as is the lower disc 42 in FIGS. 1 and 2, a fluid-tight barrier across the flow passage is established by the seal elements 44, 46, the carrier 14, and the disc. It should be noted that this arrangement thereby eliminates any need for a fluid-tight fit between the sides 14a, 14b of the carrier 14 and the adjacent spacers 24, 26, and in fact a small clearance 58 preferably is provided between each carrier side and the opposed spacer, one of which is shown in FIG. 1, to facilitate ease in moving the carrier between its upper and lower positions.

The pneumatic cylinder 16 that functions as an operator for moving the carrier 14 is mounted on a plate-like bracket 60, as by a plurality of bolts 62, and the bracket 60 is supported above the body 12 by studs 64 that are threaded into the inner members 18a, 20a of the body subs. In the usual manner, the cylinder 16 is provided with a piston rod 66 that extends downwardly from a piston (not shown) towards the carrier 14. The piston rod 66 can be connected to the carrier 14 by a clevis 68 and a pin 70 that extends through the clevis and a hole 72 in an ear 74 of the carrier. For versatility the other end of the carrier also is provided with an ear 76 having a hole 78, in the event it is desired to reverse the carrier and attach this end to the cylinder. Whichever ear is not attached to the cylinder also can be fitted with a bolt or other suitable means to function as a stop device, if desired. Although a pneumatic cylinder has been illustrated as the preferred form of operator for the carrier 14, it should be understood that other types of operators, such as a hydraulic cylinder, an electrical solenoid, or a manual jack, may be used in lieu of the cylinder 16.

The piston in the cylinder 16 is reciprocated by means of air introduced under pressure through suitable controls (not shown) that may be situated close by the operator or remote therefrom, as desired. As shown in FIGS. 1 and 2, when the piston rod 66 has been completely retracted into the cylinder 16 the disc carrier 14 is in its upper or first functional position, and the rupture disc 42 is in the flow passage 34. Conversely, when the rod 66 has been extended fully from the cylinder 16 the disc carrier 14 would be in its second or lower functional position (not shown), with the rupture disc 40 in the flow passage 34. Suitable stops can be included in the apparatus to limit the movement of the disc carrier between precisely designated positions, thereby to properly align the carrier with the flow passage 34.

When the automated rupture disc changer 10 is fitted with frangible metallic rupture discs such as 40, 42, the thickness of the disc carrier, i.e., as measured between its upstream face 14a and its downstream face 14b, is dimensioned so that when the discs 40, 42 rupture the resulting disc fragments that are retained with the carrier do not protrude or extend beyond the carrier's downstream face 14b. This dimensional aspect thereby prevents interference of the metal fragments between the carrier and the downstream seal element 46 as the carrier is moved to take the ruptured disc out of the line.

FIGS. 3 and 4 illustrate two additional embodiments of the automated rupture disc changer of this invention, these being modified for use with graphite rupture discs. The embodiment illustrated in FIG. 3 has a relatively thin disc carrier 80 with upstream and downstream faces 80a, 80b, respectively, an aperture 82, and a counterbore 84. A rupture disc 86 of graphite or other similar material is secured in the counterbore 84 by means of a split retainer ring 88 that fits into an annular groove 90 in the counterbore's surface. The disc 86 is chamfered at 86a to form with the carrier 80 a seal chamber 91, and a resilient seal element 92, such as a rubber O-ring, is positioned in the chamber 91 to provide a fluid-tight barrier between the disc and the carrier. In the same manner as in the embodiment of FIGS. 1 and 2, a fluid-tight barrier between the carrier 80 and the adjacent body subs 94, 96 is provided by annular seal elements 98, 100, and the carrier 80 is connected to the piston rod (not shown) of a pneumatic cylinder (not shown) by a clevis 102 and pin 104.

A modification of the apparatus of FIG. 3 is illustrated in FIG. 4, this modification having a disc 110 of increased diameter secured in a counterbored aperture 112 of a carrier 114 by a split retainer ring 116. In this embodiment, the disc 110 is sealed directly to the body subs 94, 96 by the seal elements 98, 100, eliminating all need for a seal between the disc and the carrier as is provided by the O-ring 92 of the FIG. 3 version.

Accordingly, it can be seen that this invention provides a greatly superior apparatus for installing and changing pressure-relief rupture discs in a fluid conduit, without need to shut down the system to which the conduit is connected, and without need for any disassembly of the apparatus to service the discs.

Although the best mode contemplated for carrying out the present invention has been herein shown and described, it will be apparent that modification and variation may be made without departing from what is regarded to be the subject matter of the invention.

What is claimed is:

1. An automated pressure-relief rupture disc changer, comprising
   a body adapted for installation in a fluid conduit and having a flow passage therethrough, said body comprising a pair of body subs each having a bore therethrough and a counterbore,
   spacer means disposed between said body subs and maintaining said subs in a predetermined spaced relation with said bores in coaxial alignment,
   a disc carrier slidably disposed between said body subs and said spacer means, said carrier having substantially parallel opposite faces extending in a direction transverse to the axes of said bores, said carrier having a plurality of side-by-side spaced disc apertures extending therethrough between said generally parallel surfaces,
   operator means for moving said carrier with respect to said body to individually position said apertures in said flow passage,
   pressure-relief rupture disc means positioned in each aperture and secured to said carrier, and
   annular seal means between said body subs and one of said carrier and said disc means to establish with said disc means a fluid-tight barrier across said flow passage.

2. An automated rupture disc changer according to claim 1 wherein the disc carrier has two disc apertures, and a frangible graphite rupture disc mounted in each aperture.

3. An automated rupture disc changer according to claim 1 wherein the disc carrier has two disc apertures in each of which a metallic rupture disc is mounted.

4. An automated rupture disc changer according to claim 1 wherein the rupture disc means is sealed to the disc carrier, and wherein the annular seal means extends between the carrier and the body subs.

5. An automated rupture disc changer according to claim 1 wherein the annular seal means establishes a fluid-tight seal directly between the rupture disc means and the body subs.

6. An automated rupture disc changer according to claim 1 wherein the apertures are spaced so that positioning of one rupture disc means in functional location in the flow passage disposes the other rupture disc means in a location accessible from outside the apparatus for servicing without need for apparatus disassembly.

* * * * *